(12) United States Patent
Tabata et al.

(10) Patent No.: US 9,751,443 B2
(45) Date of Patent: Sep. 5, 2017

(54) SEAT CUSHION (71) Applicant: TACHI-S CO., LTD., Akishima-shi (JP)

(72) Inventors: Tsuyoshi Tabata, Akishima (JP); Hideki Kamata, Akishima (JP)

(73) Assignee: TACHI-S CO., LTD., Akishima-shi (JP)

( * ) Notice: Subject to any disclaimer, the term of this patent is extended or adjusted under 35 U.S.C. 154(b) by 0 days.

(21) Appl. No.: 14/899,283

(22) PCT Filed: Jun. 9, 2014

(86) PCT No.: PCT/JP2014/065201
§ 371 (c)(1),
(2) Date: Dec. 17, 2015

(87) PCT Pub. No.: WO2015/001913
PCT Pub. Date: Jan. 8, 2015

(65) Prior Publication Data
US 2016/0137112 A1 May 19, 2016

(30) Foreign Application Priority Data
Jul. 4, 2013 (JP) ................................. 2013-140626

(51) Int. Cl.
B60N 2/58 (2006.01)
B60N 2/64 (2006.01)
B60N 2/70 (2006.01)

(52) U.S. Cl.
CPC ............... B60N 2/646 (2013.01); B60N 2/58 (2013.01); B60N 2/5816 (2013.01);
(Continued)

(58) Field of Classification Search
CPC ...... B60N 2/58; B60N 2/5825; B60N 2/5875; B60N 2/5891; B60N 2/646; B60N 2/5816; B60N 2/70; B60N 2/7017
See application file for complete search history.

(56) References Cited

U.S. PATENT DOCUMENTS 5,501,165 A * 3/1996 Nagashima ............ D05B 35/08
112/132
7,401,829 B2 * 7/2008 Michalski ............... B60R 13/02
112/418

(Continued)

FOREIGN PATENT DOCUMENTS

CN 101312851 A 11/2008
EP 0 097 040 A2 12/1983
(Continued)

OTHER PUBLICATIONS

Translation of Written Opinion in PCT/JP2014/065201.*
(Continued)

Primary Examiner — Philip Gabler
(74) Attorney, Agent, or Firm — Oblon, McClelland, Maier & Neustadt, L.L.P.

(57) ABSTRACT

A seat cushion of a seat, which can avoid creation of wrinkle or crease in an area of a trim cover element corresponding to a lateral side of the seat cushion, irrespective of a downward load applied to the seat cushion, thereby making it possible to maintain an outer appearance of the seat cushion in a good quality condition. In a surface of a recessed region of a padding forming a part of the seat cushion, defined flexible portions are formed to be flexed in an inward direction by a downward load applied thereto. Non-bonding areas are defined between the trim cover element and the flexible portions.

11 Claims, 6 Drawing Sheets (52) U.S. Cl.
CPC ......... *B60N 2/5825* (2013.01); *B60N 2/5875* (2013.01); *B60N 2/70* (2013.01); *B60N 2/7017* (2013.01)

(56) References Cited

U.S. PATENT DOCUMENTS

| | | | | |
|---|---|---|---|---|
| 7,823,980 B2* | 11/2010 | Niwa | ................... | B60N 2/5891 297/218.2 |
| 2006/0237986 A1* | 10/2006 | Brockschneider | ... | B60N 2/5825 296/65.09 |

FOREIGN PATENT DOCUMENTS

| EP | 0 097 040 A3 | 12/1983 |
|---|---|---|
| EP | 0 566 065 A1 | 10/1993 |
| JP | 63-122493 | 5/1988 |
| JP | 1-99300 | 7/1989 |
| JP | 2004-306869 A | 11/2004 |
| JP | 4247034 B2 | 4/2009 |
| JP | 2012-232687 A | 11/2012 |
| JP | 2012-232688 A | 11/2012 |

OTHER PUBLICATIONS

International Search Report Issued Aug. 26, 2014 in PCT/JP14/65201 Filed Jun. 9, 2014.
Combined Chinese Office Action and Search Report issued Oct. 25, 2016 in Patent Application No. 201480034771.0 (with partial English translation and English translation of categories of cited documents).
Notification of Reasons for Refusal issued Sep. 6, 2016 in Japanese Patent Application No. 2013-140626 (with English language translation).
Extended European Search Report issued on Feb. 3, 2017 in Patent Application No. 14819378.2.

* cited by examiner

SEAT CUSHION

TECHNICAL FIELD

The present invention relates to a seat cushion. For example, the invention is directed to a seat cushion for use with a vehicle seat, wherein a lateral surface of the seat cushion has a space region defined therein in a recessed manner.

BACKGROUND ART

Conventionally, in this kind of technical field, there has been known a seat cushion of a rear seat located behind a front seat. This seat cushion of the rear seat is formed with a recessed region in a lower region of corner wail of the seat cushion on a side facing a door of a vehicle, wherein the recessed region provides a recessed space which allows a passenger's foot or feet to pass and move therethrough. Formation of such a foot passage recessed space involves: defining a corresponding recessed region in a foam padding provided in the aforesaid lower region of the seat cushion's corner wall; and thereafter bonding a localized area of a trim cover element to a surface of that recessed region of the foam padding of the seat cushion, by means of an adhesive. (See two Japanese Laid-Open Patent Publications Nos. 2012-232688 and 2012-232687, for example)

In this rear seat, the foot passage recessed space defined in the lower region of the corner wall of the seat cushion indeed permits a passenger's foot or feet to smoothly move and pass between the front and rear seats, so that the passenger can far more easily mount onto and descend from the rear seat than a normal rear seat having no such foot passage space. Further, the foot passage recessed space is provided to the seat cushion on a side facing the door of vehicle, thereby facilitating the ease with which the passenger can mount onto and descend from the rear seat through the door, and therefore there is no need to cut out a substantive portion of the seat cushion's corner that faces the door of vehicle. In other words, there is no requirement for reducing a seating surface area of the seat cushion, hence allowing a seat manufacturer to maintain a whole area of original seating surfaces of the seat cushion to give a satisfied support and comfort to a passenger seated thereat.

PRIOR-ART LITERATURE

Patent-Related Document

Patent-related Document 1:
  Japanese Laid-Open Patent Publication No. 2012-232688
Patent-related Document 2:
  Japanese Laid-Open Patent Publication No. 2012-232687

SUMMARY OF THE INVENTION

Problems to be Solved by the Present Invention

The above-described conventional seat technique features the foot passage recessed space defined in the lower region of the door-side corner of seat cushion of the rear seat, which indeed allows a passenger to quite smoothly mount onto and descend from the rear seat, and as stated above, formation of such foot passage recessed space is based on the steps of defining a corresponding recessed region in the foam padding of the lower region of the corner of the seat cushion, and bonding a pertinent localized area of the trim cover element to the surface of the recessed region of foam padding by means of an adhesive. However, the fact is that the foam padding which occupies most of the seat cushion of the rear seat is partially recessed just at that foot passage recessed space region, and therefore, when a downward load applied to the seat cushion is imparted to the foam padding, a surface of such recessed region of the foam padding is locally deformed by the downward load. Further, since the trim cover element is bonded by adhesive to the surface of the recessed region of the foam padding, wrinkles or creases are inevitably created in surface areas of the trim cover element that correspond to the thus-deformed areas of the foam padding. Consequently, there has been the problem that wrinkles or creases appear in the surface areas of the trim cover element and impair the outer aesthetic appearance of the door-side corner portion of the seat cushion, which results in a quality degradation to the outer appearance of the rear seat.

It is a purpose of the present invention to provide a seat cushion which can avoid creation of wrinkle or crease in a localized area of a trim cover element corresponding to a lateral side of the seat cushion, irrespective of a downward load applied to the seat cushion, thereby making it possible to maintain an outer appearance of the seat cushion in a good quality condition.

Means for Solving the Problem

In accordance with the present invention, there is provided a seat cushion including: a padding which includes: an upper surface corresponding to an upper seating surface of the seat cushion; and a recessed region formed in a lateral surface of the padding, wherein the padding has a cushioning property; and a trim cover element bonded to surfaces of the padding, said seat cushion comprising:

a flexible portion defined in a surface of the recessed region of said padding, the flexible portion being so formed as to be flexed by a downward load applied thereto, wherein the surface of the recessed region has a predetermined area which includes the flexible portion, and in that predetermined area, there is defined a non-bonding area where the padding and the trim cover element are precluded from being bonded to each other.

According to this seat cushion, when a downward load is applied to the padding, the flexible portion defined in the surface of the recessed region of the padding is flexed. Further, the non-bonding area is defined in the predetermined area of that recessed region's surface which includes the flexible portion, so that the padding and trim cover element are not bonded to each other in the non-bonding area. Hence, at the time the downward load is applied to the padding though the seat cushion, the flexible portion is flexed to absorb the load and further the non-bonding area is provided, which in effect avoids creation of wrinkle or crease in the surface of the trim cover element, whereby it is possible to maintain an outer appearance of the seat cushion in a good quality condition.

In the case where the seat cushion has a door-side corner portion situated on a side facing a door, the flexible portion may be formed in such door-side corner portion of the seat cushion. In that case, a selected localized area of the trim cover element may cover a lateral surface of the door-side corner portion, and therefore, creation of wrinkle or crease in that localized area of the trim cover element is avoided effectively, so that an outer appearance of the seat cushion can be maintained in a good quality condition.

Preferably, the flexible portion may comprise: an upper flexible portion defined in an upper side of the recessed region of the padding; and a lower flexible portion defined in a lower side of the recessed region of the padding. In that case, a downward load applied to the seat cushion will be distributed into each of such upper and lower flexible portions, whereby creation of wrinkle or crease in the trim cover element can be avoided more assuredly than one flexible portion.

The flexible portion may be defined in substantially a central area of a vertically extending surface of the recessed region of the padding. In that case, a downward load applied to the seat cushion will be intensively exerted upon this sort of flexible portion, as a result of which, the flexible portion itself will be flexed, thereby avoiding creation of wrinkle or crease in an area of the trim cover element corresponding to the flexible portion, so that an outer appearance of the seat cushion can be maintained in a good quality condition.

As one aspect of the present invention, a sheet material having a through-opening region formed therein may be interposed between the padding and the trim cover element, such that the through-opening region of the sheet material is situated at a location corresponding to the flexible portion of the padding, thereby defining thereat a non-bonding area where the padding and the trim cover element are precluded from being bonded to each other. In this instance, provision of such sheet material having the through-opening effectively facilitates the ease of setting the non-bonding area at the flexible portion during assembly of the seat cushion.

Effects of the Invention

The present invention therefore makes it possible to avoid creation of wrinkle or crease in the area of the trim cover element corresponding to the lateral surface of the seat cushion, irrespective of a downward load applied to the seat cushion, so that an outer appearance of the seat cushion can be maintained in a good quality condition.

MODE FOR CARRYING OUT THE INVENTION

With reference to FIGS. 1 to 5 of the annexed drawings, exemplary embodiments of a seat cushion will be described. In particular, a description will be made of the seat cushion as applied to a rear seat for automobile by way of one example, in accordance with the present invention.

Figure 1:
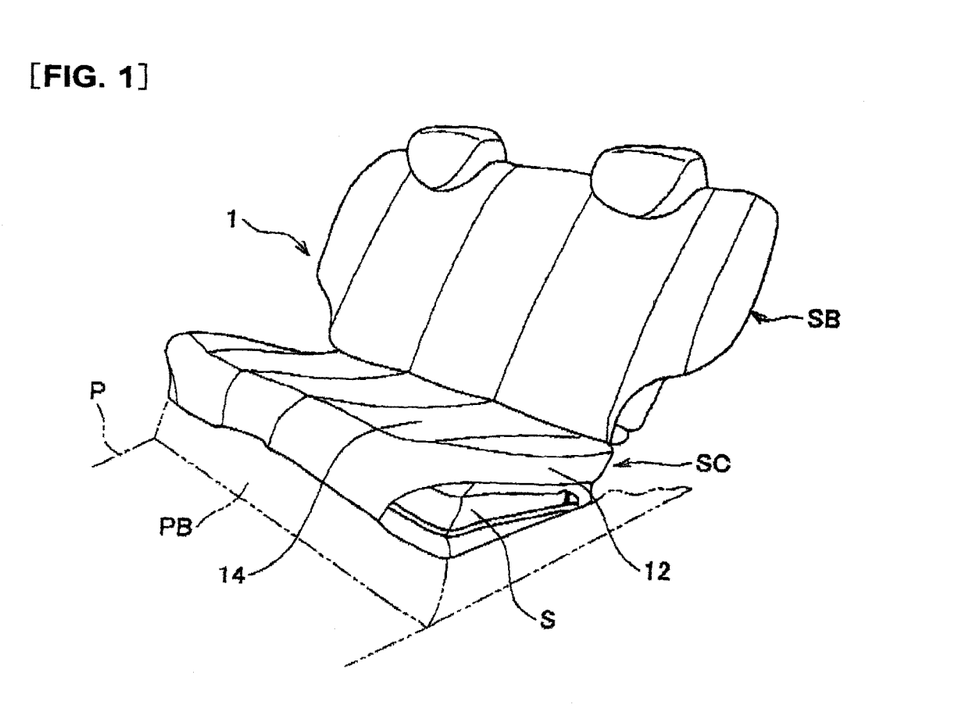
FIG. 1: A perspective view showing one exemplary embodiment of a rear seat in accordance with the present invention.
Figure 2:
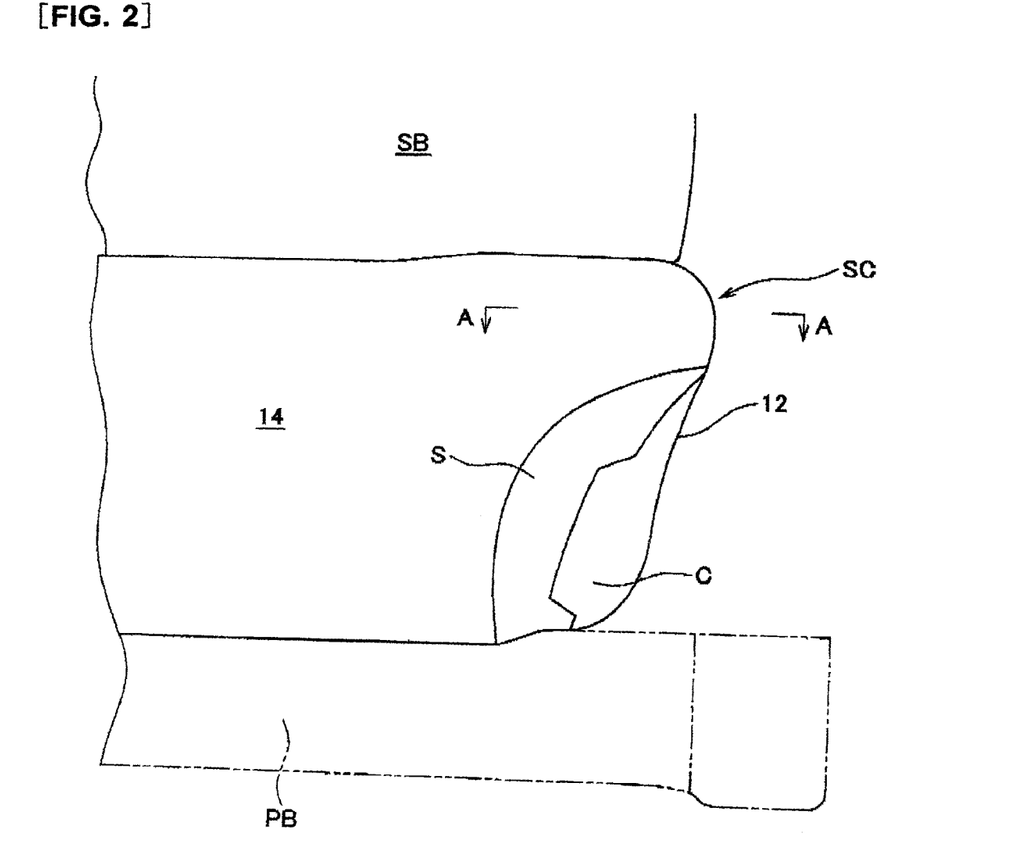
FIG. 2: A front view indicating a principal part of the rear seat shown in the FIG. 1.

FIGS. 1 and 2 show a rear seat 1 which is typically located behind a front seat. The rear seat 1 is comprised of: a seat cushion SC fixed on an upwardly protruding area PB of a front floor panel P; and a seat back SB reclinalbe relative to the seat cushion SC.

The seat cushion SC includes a foam padding 2 made of a foam material. The foam padding 2 is placed and supported on a horizontally-extending wire frame 3, wherein the horizontally-extending wire frame 3 is mounted on an upper surface of a seat frame secured by bolt (s) to the upwardly protruding area PB of the front floor panel P. Surfaces of the foam padding 2 are covered with a trim cover element 4, and also, end portions of the trim cover element 4 are securely connected to the wire frame 3 by a connecting element such as a hog ring (s) 5.

The seat cushion SC, forming a part of the rear seat 1, has: a front side portion 14 situated forwardly of the seat cushion; and an outward side portion 12 situated laterally of the seat cushion. In this seat cushion SC, a door-side corner portion C is defined between a door-side area of the front side portion 14 and a forward area of the outward side portion 12, wherein the door-side corner portion C as well as the door-side area of the front side portion 14 face a door of a vehicle, and so does the outer side portion 12, though not shown. Provided in a lower region of such door-side corner portion C is a foot passage recessed space S which allows a passenger's foot or feet to pass and move therethrough. This foot passage recessed space S is so shaped as to become progressively large in a forward direction along a bottom side of the seat cushion.

Figure 3:
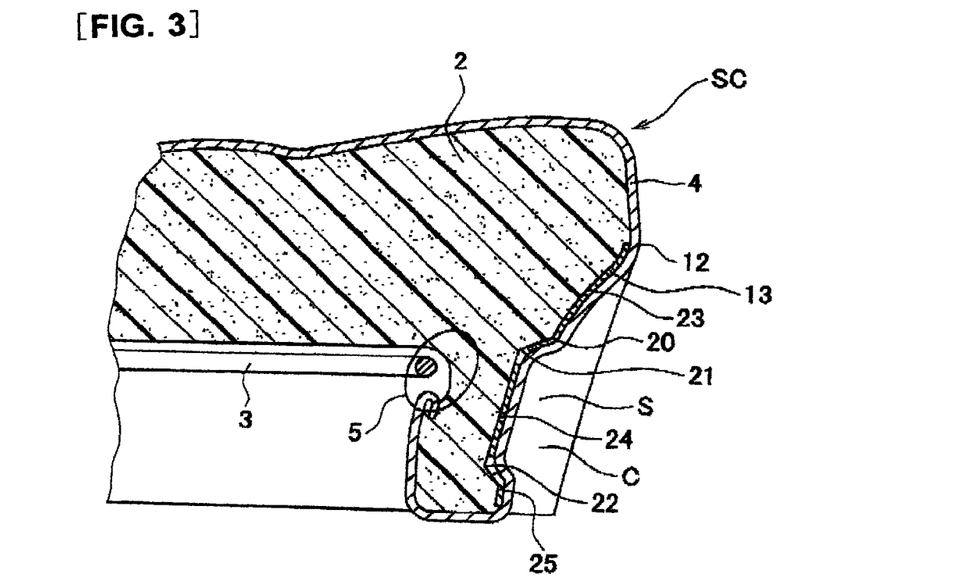
FIG. 3: A sectional view of the rear seat taken along the line A-A in the FIG. 2.
Figure 4:
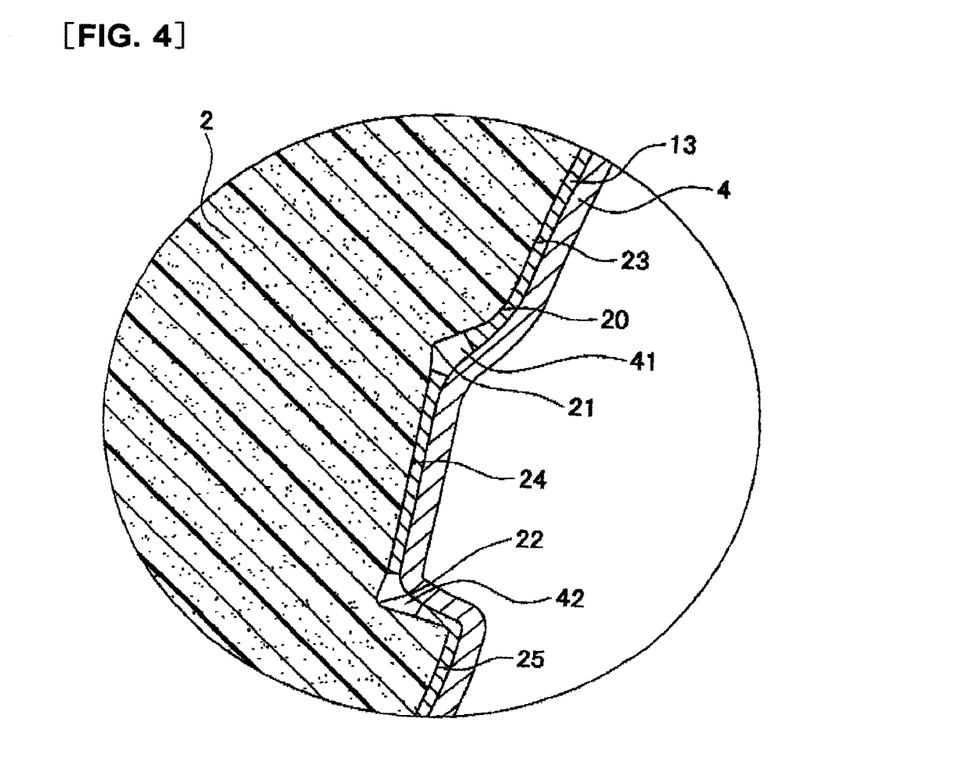
FIG. 4: An enlarged view indicating a principal part of a seat cushion shown in the FIG. 3.

As shown in FIGS. 3 and 4, in the foam padding 2 forming a part of the seat cushion SC, a recessed region 20 is provided as a base for constituting the foregoing foot passage recessed space S. This recessed region 20 is, in its surface, formed with: an upper flexible corner portion 21; and a lower flexible corner portion 22, such that the former 21 has an open-angled configuration and extends along an upper end side of the recessed region 2a, whereas the latter 22 has an open-angled configuration and extends along a lower end side of the recessed region 2a. The actions of those two flexible corner portions 21 and 22 are such that, upon receiving a downward load from the seat cushion, the two flexible corner portions 21 and 22 are resiliently flexed in an inward direction toward each other. In this regard, it is to be seen that the upper flexible corner portion 21 is defined between a first sloped surface 23 and a central surface 24, wherein the first sloped surface 23 slopes downwards from an upper side of the recessed region 2a of the foam padding 2 in a direction inwardly of the recessed region 2a, and wherein the central surface 24 extends downwardly from the first sloped surface 23. On the other hand, the lower flexible corner portion 22 is defined between the aforesaid central surface 24 and a second sloped surface 25 that slopes downwards from a lower side of the central surface 24 in a direction outwardly of the recessed region.

Accordingly, it is to be appreciated that the upper and lower flexible corner portions 21 and 22 are provided in the surface of the recessed region 2a of the foam padding 2 so as to be resiliently flexible inwardly thereof by a downward load applied to the seat cushion SC, and that such downward load to the seat cushion will be intensively exerted on and absorbed in the upper and lower flexible corner portions 21 and 22 only, so that very limited areas of the foam padding 2 corresponding to those two flexible corner portions will be flexed or bent inwardly thereof so as to prevent deformation of the recessed region per se.

The trim cover element 4 covers the foam padding 2 of the seat cushion SC, and with regard to the recessed region 2a in the foam padding 2, a pertinent localized area of the trim cover element 4 is bonded to a surface of that recessed region 2a by means of an adhesive 13. Note that the adhesive 13 must be applied to a reverse surface of the aforesaid localized area of the trim cover element 4 in advance before affixing the trim cover element to the foam padding. Preferably, the adhesive 13 may be of a thermally meltable type, so that heating and pressing can be applied thereto for firm bonding in this regard.

In applying the adhesive 13 to the reverse surface of the localized area of the trim cover element 4, according to the present embodiment, it is important that application of the adhesive 13 should be avoided at each of first and second localized areas of the trim cover element 4 which are to substantially cover the upper and lower flexible corner portions 21 and 22 of the foam padding 2, respectively. After the adhesive 13 have been applied as such, the first and second localized areas of the trim cover element 4 are not bonded to the upper and lower flexible corner portions 21 and 22, respectively. Hence, such non-bonded first and second localized areas of trim cover element may be referred to as first and second non-bonding areas 41 and 44, respectively, and it is to be understood that the first non-bonding area 41 is given between the upper flexible corner portion 21 and the pertinent first localized area of the trim cover element 4, whereas the second non-bonding area 42 is given between the lower flexible corner portion 22 and the pertinent second localized area of the trim cover element 4.

Figure 5:
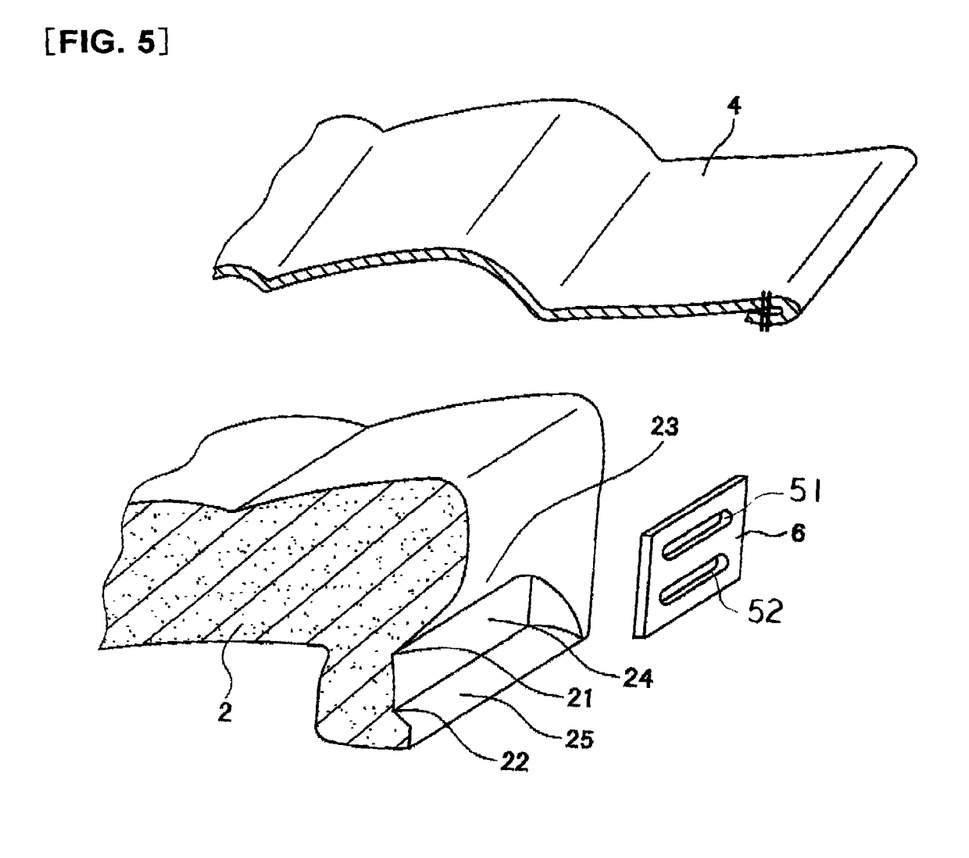
FIG. 5: A perspective view which explanatorily indicates how bonding is effected at the seat cushion of the rear seat shown in the FIG. 1.

As indicated in FIG. 5, for bonding the trim cover element 4 to the recessed region 2a of the foam padding 2, a hot-melt adhesive sheet 6 may be used, for instance, which is a sheet of thermally meltable adhesive. In this case, of course, the aforementioned first and second non-boding areas 41 and 42 must respectively be set at the first and second localized areas of the trim cover element 4 which are to substantially cover the upper and lower flexible corner portions 21 and 22, respectively. Therefore, the hot-melt adhesive sheet 6 is formed with: a first through-opening region 51 at a location corresponding to the first non-bonding area 41; and a second through-opening region 52 at a location corresponding to the second non-bonding area 42. With this arrangement, when the trim cover element 4 has been bonded by the hot-melt adhesive sheet to the foam padding 2, the first through-opening region 51 in effect provides a spacing between the first localized area of the trim cover element 4 and a corresponding first area of the foam padding 2 which includes a substantial part of the upper flexible corner portion 21, and also the second through-opening region 52 provides a spacing between the second localized area of the trim cover element 4 and a corresponding second area of the foam padding 2 which includes substantial part of the lower flexible corner portion 22. This arrangement is effective for precluding the trim cover element 4 from being bonded to the upper and lower flexible corner portions at each of the first and second through-opening regions 51 and 52. In this respect, provision of the two non-contact areas 41 and 42 is not limited to the illustrative mode using the hot-melt adhesive sheet 6, but instead thereof, for example, two elongated strips of unwoven fabric may be firmly attached to the foam padding 2 at two locations corresponding to the first and second non-contact areas 41 and 42, respectively, which will also achieve the same non-bonding effect stated above between the trim cover element and the flexible corner portions. Or, if a liquid adhesive agent is used and applied to the trim cover element, a masking element may be releasably attached to each of the aforesaid first and second localized areas of the trim cover element which respectively correspond to the first and second non-contact areas.

As stated above, the upper and lower flexible corner portions 21 and 22 are provided in the surface of the recessed region 2a of the foam padding 2 so as to be resiliently flexed inwardly thereof by a downward load applied thereto through the seat cushion SC. Hence, a downward load applied to the seat cushion SC is intensively exerted on and absorbed in those upper and lower flexible corner portions 21 and 22. Naturally, at that time, the upper and lower flexible corner portions 21 and 22 are flexed and deformed. But, such deformed two flexible corner portions 21 and 22 of the foam padding 2 are never bonded to the trim cover element 4 at the two non-bonding areas 41 and 42, whereby the trim cover element 4 is not influenced by the deformation of the upper and lower flexible corner portions 21 and 22 and therefore prevented from deformation. Consequently, this arrangement can prevent creation of wrinkle or crease in the trim cover element 4 and makes it possible to maintain the surfaces of the trim cover element 4 in a creaseless condition or to minimize the number of creases therein.

Figure 6:
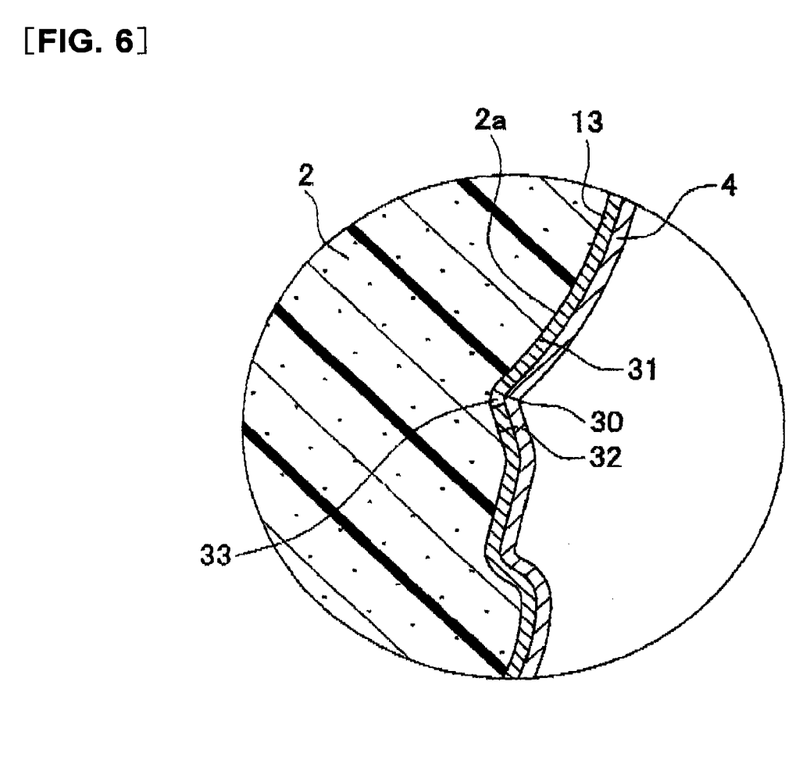
FIG. 6: An enlarged view indicating another embodiment applied to the sectional view of the rear seat taken along the line A-A in the FIG. 4.

Again, the foregoing description is dedicated to the mode where the upper and lower flexible corner portions 21 and 22 are provided in the surface of the recessed region 2a of the foam padding 2 so as to be resiliently flexed inwardly thereof by a downward load applied thereto from the seat cushion SC, so that any load applied downwardly to the seat cushion SC will be intensively exerted on and absorbed in the upper and lower flexible corner portions 21 and 22. However, this is not limiting. Instead thereof, as shown in FIG. 6 for example, one flexible valley portion 30 may be provided to substantially a central area of the vertically extending lateral surface of the foam padding. More specifically, the flexible portion 30 may be provided in the surface of the recessed region 2a of the foam padding 2, as shown, so as to be defined between a first sloped region 31 and a second sloped region 32, wherein the first sloped region 31 slopes downwards from the upper side of the recessed area 2a in a direction inwardly of the recessed region 2a, whereas the second sloped region 32 slopes upwardly from the lower side of the recessed area 2a in a direction outwardly of the recessed region 2a. In this second embodiment, a downward load applied to the seat cushion will be intensively exerted on such single flexible portion 30, thereby causing resilient flexure of the first and second sloped regions to absorb the downward load thereat. Also, the flexible portion 30 itself serves as a non-contact area 33, thus precluding its being bonded to the trim cover element. With this arrangement, it is possible to avoid creation of wrinkle or crease in the trim cover element.

Figure 7:
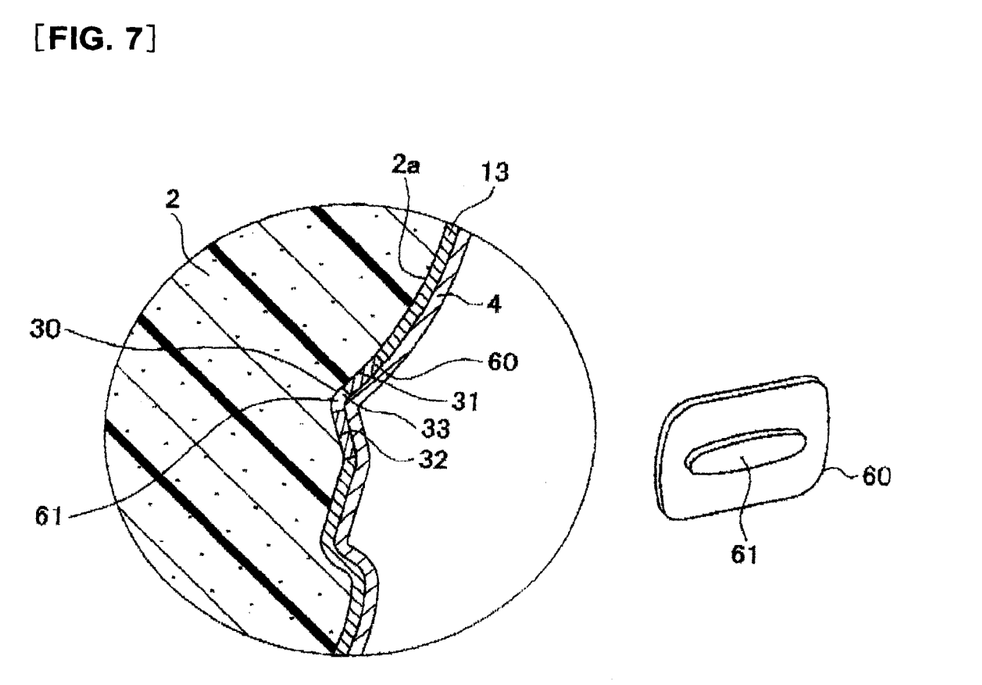
FIG. 7: An enlarged view indicating still another embodiment applied to the sectional view of the rear seat taken along the line A-A in the FIG. 4.

As shown in FIG. 7, similarly to the preceding first embodiment, the present second embodiment may employ a hot-melt adhesive sheet 60 which is a sheet of thermally meltable adhesive, for bonding the trim cover element to the foam padding. In this instance, the aforesaid non-boding area 33 must be set at a particular localized area of the trim cover element which is to substantially cover the flexible portion 30, and therefore the hot-melt adhesive sheet 60 is shown to have a through-opening region 61 formed therein at a location corresponding to that non-bonding area 33. With this arrangement, when the trim cover element 4 has been bonded by the hot-melt adhesive sheet to the foam padding 2, the through-opening region 61 in effect provides a spacing between the aforesaid localized area of the trim cover element and a corresponding area of the foam padding 2 which includes a substantial part of the flexible portion 30, whereby the trim cover element 4 is precluded from being bonded to the flexible portion 30 at the through-opening region 61, thus establishing the non-contact area 33 thereat. It is therefore appreciated that exertion of a downward load upon the flexible portion 30, which causes the same 30 to resiliently flex inwardly thereof to absorb the downward load, as well as the above-noted non-bonding effect can avoid creation of wrinkle or crease in the trim cover element.

While the present invention has been described as applied to the rear seat thus far, it should be understood that the invention is not limited thereto, but can be applied to any kind of seat having a seat cushion, insofar as the seat includes a recessed region formed in a lateral surface of the seat cushion and a trim cover element having a localized area to be bonded to that recessed region.

DESCRIPTION OF THE REFERENCE NUMERALS

SC denotes a seat cushion.
2 denotes a foam padding.
2a denotes a recessed region formed in the foam padding.
4 denotes a trim cover element.
13 denotes an adhesive.
21 and 22 denote two flexible corner portions, respectively.
41 and 42 denote two non-bonding areas, respectively.

The invention claimed is:

1. A seat cushion comprising:
a padding which includes:
    an upper surface corresponding to an upper seating surface of the seat cushion,
    a recessed region formed in a lateral surface of said padding, the padding having a cushioning property, and
    a trim cover element bonded to surfaces of said padding,
    wherein a flexible portion is defined in a surface of the recessed region of said padding, said flexible portion having an upper flexible portion and a lower flexible portion and being formed so as to be flexed by a downward load applied thereto from said upper surface of the padding,
    wherein
        said surface of said recessed region has a first area which includes said flexible portion and a second area including said surface of the recessed region between said upper flexible portion and lower flexible portion,
        said padding and said trim cover element are bonded to each other in said second area,
        in said first area, there is defined an area where said padding and said trim cover element are precluded from being bonded to each other, and
        wherein a size of said recessed region increases in a direction opposite to a direction in which said downward load is applied.

2. The seat cushion as described in claim 1, wherein said seat cushion has a door-side corner portion situated on a side facing a door, and wherein said flexible portion is formed in said door-side corner portion of the seat cushion.

3. The seat cushion as described in claim 1, wherein said flexible portion is defined at one location in said recessed region of said padding.

4. The seat cushion according to claim 1, wherein
said seat cushion has a door-side corner portion situated on a side facing a door,
said flexible portion is formed in said door-side corner portion of the seat cushion,
said surface of said recessed region between said upper and lower flexible portions extends in a vertical direction of said padding,
said second area is defined substantially centrally of said flexible portion formed in said door-side corner portion, in such a manner as to be recessed from said upper and lower flexible portions, and
said recessed region provides a foot passage space that allows a foot or feet of a passenger to pass and move therethrough.

5. A seat cushion comprising:
a padding which includes:
    an upper surface corresponding to an upper seating surface of the seat cushion,
    a recessed region formed in a lateral surface of said padding, the padding having a cushioning property, and
    a trim cover element bonded to surfaces of said padding,
    wherein a flexible portion defined in a surface of the recessed region of said padding, said flexible portion having an upper flexible portion and a lower flexible portion and being formed so as to be flexed by a downward load applied thereto from said upper surface of the padding; and
    a sheet material having a through-opening region formed therein, said sheet material being interposed between said padding and said trim cover element, such that said through-opening of the sheet material is situated at a location corresponding to said flexible portion of said padding, thereby defining thereat a first area where said padding and said trim cover element are precluded from being bonded to each other, and a second area including the surface of the recessed region between the upper flexible portion and lower flexible portion where said padding and said trim cover element are bonded to each other,
    wherein a size of said recessed region increases in a direction opposite to a direction in which said downward load is applied.

6. The seat cushion as described in claim 5, wherein said seat cushion has a door-side corner portion situated on a side facing a door, and wherein said flexible portion is formed in said door-side corner portion of the seat cushion.

7. The seat cushion as described in claim 6, wherein said flexible portion is defined at one location in said recessed region of said padding.

8. The seat cushion according to claim 5, wherein
said seat cushion has a door-side corner portion situated on a side facing a door,
said flexible portion is formed in said door-side corner portion of the seat cushion,
said surface of said recessed region between said upper and lower flexible portions extends in a vertical direction of said padding,
said second area is defined substantially centrally of said flexible portion formed in said door-side corner portion, in such a manner as to be recessed from said upper and lower flexible portions, and
said recessed region provides a foot passage space that allows a foot or feet of a passenger to pass and move therethrough.

9. A seat cushion comprising:
a padding having a cushioning property, said padding including:
   an upper surface corresponding to an upper seating surface of the seat cushion;
   a recess region formed in a lateral surface of said padding, said recessed region having a central recessed portion defined therein; and
   a trim cover element bonded to surfaces of said padding,
   wherein a flexible portion is defined in a surface of the recessed region of said padding, said flexible portion having:
   an upper sloped flexible portion defined in an upper side of said recessed region, said upper sloped flexible portion extending aslant in a direction from said lateral surface of said padding toward said recess region; and
   an lower sloped flexible portion defined in a lower side of said recessed region, said lower sloped flexible portion extending aslant in a direction from said lateral surface of said padding toward said recessed region;
   wherein said central recessed portion of said recessed region is situated between said upper and lower sloped flexible portions and recessed therefrom,
   wherein said surface of said recessed region has:
      a first area including said flexible portion; and
      a second area including said central recessed portion,
   wherein
      said padding and said trim cover element are bonded to each other in said second area,
   and
      in said first area, there is defined an area where said padding and said trim cover element are precluded from being bonded to each other,
   and
      wherein said upper and lower sloped flexible portions are flexed in a direction toward each other relative to said central recessed portion by a downward load applied thereto from said upper surface of said padding, so that said first area is resiliently deformed, while preventing deformation of said second area.

10. The seat cushion according to claim 9,
wherein said seat cushion has a door-side corner portion of the seat cushion,
wherein said central recessed portion is located substantially in a central area of said surface of said recessed region and extends in a vertical direction of said padding, and
wherein said recessed region provides a foot passage space that allows a foot or feet of a passenger to pass and move therethrough.

11. The seat cushion according to claim 9, wherein said flexible portion is defined at one location in said recessed region of said padding.

\* \* \* \* \*